TIMER WITH CARD PROGRAM CONTROL, AND THE LIKE

Filed April 10, 1962 3 Sheets-Sheet 1

INVENTORS
IVAN TREPANIER
GEORGE CARSON LENNOX
BY
ATTORNEY

TIMER WITH CARD PROGRAM CONTROL, AND THE LIKE

Filed April 10, 1962 3 Sheets-Sheet 2

INVENTORS
IVAN TREPANIER
GEORGE CARSON LENNOX
BY Robert R Candor
ATTORNEY

TIMER WITH CARD PROGRAM CONTROL, AND THE LIKE

Filed April 10, 1962

3 Sheets-Sheet 3

INVENTORS
IVAN TREPANIER
GEORGE CARSON LENNOX
BY Robert R Candor
ATTORNEY

United States Patent Office 3,255,321

Patented June 7, 1966

3,255,321
TIMER WITH CARD PROGRAM CONTROL, AND THE LIKE

Ivan Trepanier, Oakville, and George C. Lennox, Southbury, Conn., assignors to Robertshaw Controls Company, Richmond, Va., a corporation of Delaware Filed Apr. 10, 1962, Ser. No. 186,507
25 Claims. (Cl. 200—46)

This invention relates to a Timex with card program control and the like.

One feature of this invention relates to the use of a plurality of time control cards which may be easily and quickly prepared to produce a plurality of individually selected programs.

Another feature includes the use of these cards in a card holder which has means to receive impulses from said cards to control or modify an energy flow controller by said impulses.

Another of the features of this invention, relates to a timing construction and method including the use of a card or plate on which notches or other irregularities are formed about an axial center, and which card may be inserted in or placed on a card or plate holder, which has a reading means or roller movable over said notches or other irregularities about an axis coinciding with said axial center. The reading means or roller causes modifications in an energy controller, such as an electric switch and the like, in response to reading impulses caused in said reading means or roller.

Another feature of this invention relates to the use of a plurality of cards or plates which have been provided with individually prepared notches or irregularities so the use of the various cards or plates in the card or plate holder provides a series of easily changed timed programs.

Another feature of this invention relates to the use of a card or plate with a circular opening with an axial center and with a notch forming edge, the card being inserted in or placed on a holder with a notch reading means movable over said notch forming edge to produce modification in an energy controller such as a switch or the like.

Another feature of this invention includes the use of a card or plate holder having a card supporting plate, a card retaining plate adjacent said card supporting plate, and a drive shaft supporting plate adjacent said card retaining plate and having a pivoted roller construction movable in a roller receiving opening with a card being insertable between said card supporting plate and said card retaining plate with roller actuating notches or irregularities on said card to actuate said roller and to modify an energy controller in accordance with impulses produced on said roller construction.

Another feature of this invention includes a method of placing a plate with a substantially circular notch forming zone in a reading holder, circularly moving a notch reading construction past said zone to cause notch reading oscillations in said construction, and modifying the action of an energy flow controller in response to said oscillations.

Another feature includes the method of using a plurality of individually prepared cards with individually prepared notches by selectively placing such cards on a holder which actuates an energy flow controller in response to actuations by said notches.

An object of this invention is to provide apparatus for modifying an energy flow controller according to one or more of the features herein disclosed.

Another object of this invention is to provide a method of modifying an energy flow controller according to one or more of the features herein disclosed.

Other features are apparent from this disclosure, the appended claims, and/or the accompanying drawings in which:

FIGURE 10 is a diagrammatic view showing the use of a controller of this invention with a domestic range and the like.

Figures 1, 2, 3:
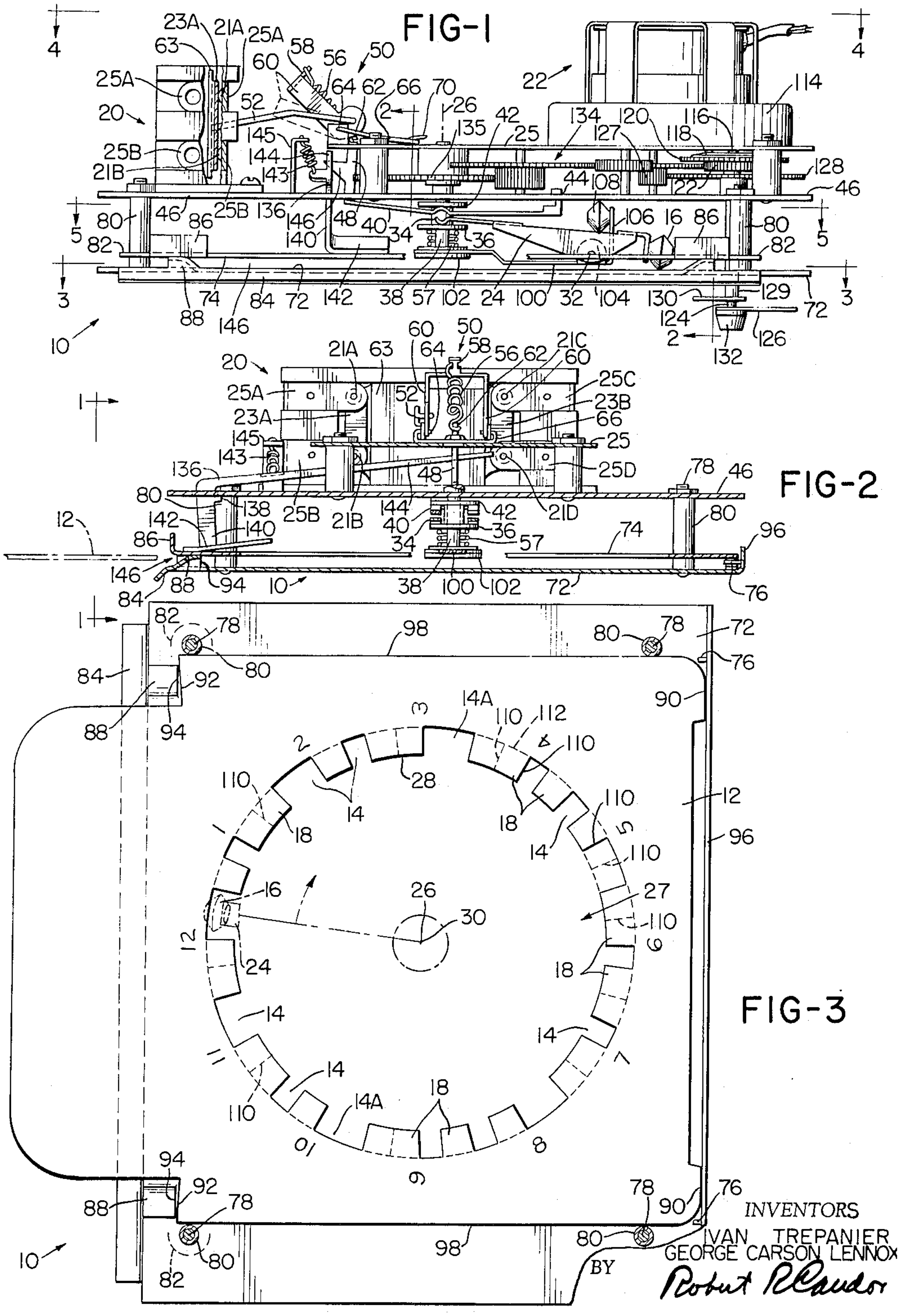
FIGURE 1 is a view of the card or plate receiving side of a construction according to this invention.
FIGURE 2 is a view taken along the line 2—2 of FIGURE 1.
FIGURE 3 is a view along line 3—3 of FIGURE 1.

The words card and plate are used in this application somewhat interchangeably to define a somewhat thin piece of cardboard, metal, plastic and any other suitable substance and shape to perform the functions herein disclosed in connection with such card or plate.

Certain words are used in this application which indicate direction, relative position and the like. Such words are used for the sake of brevity and clearness. However, it is to be understood that these words apply only to the specific illustrations in the drawings, and that the actual parts in use may have entirely different directions, etc. Examples of such words are "vertical," "horizontal," "upper," etc.

According to this invention a plate or card holder 10 may receive one or more cards or plates 12 with notches or irregularities 14 formed on said card. A notch reading means or roller 16 is movable over the notches 14 and over the tongues 18 which form the notches 14 to cause oscillations in the reading means or roller 16 as it moves over the notches 14 and tongues 18.

The oscillations of the roller 16 cause variations or modifications in the energy flow through the energy controller 20 in response to such oscillations.

The energy controller 20 may be a switch construction in which electrical stationary contacts 21A, 21B, 21C, 21D and movable bridging contacts 23A and 23B, for example, may be modified by opening and closing such contacts to modify the flow of electrical energy through said controller 20. Electrical energy flow may also be modified by a variable resistance and the like which may be varied by the oscillations. Other forms of energy flow may be likewise controlled. For example, the flow of fluids under differential pressure may be controlled by a controller having a valve construction, a variable restriction construction or the like.

The travel of the roller or reading means 16 over the irregularities 14 and 18 may be caused by any suitable drive means. For example, it may be produced by a timer motor 22, and the like. The motor may be supported on a plate 25.

The motor 22 may drive a pivoted arm construction 24 to rotate it about a rotation axis 26.

The cards or plates 12 may have the circular irregularity pattern 14, 18 formed in any suitable manner. For example, a card or plate 12 may have a circular opening 27 with a notch forming edge 28 surrounding a center point or axial center 30 about which the reading roller or other reading means is to be moved. When the card or plate 12 is inserted in or placed on the plate holder 10 the card 12 is properly held so the axial center 30 of the card opening 27 substantially coincides with the rotation axis 26. This causes the reading means or roller 16 to move in a circular path over the notches 14 and tongues 18 to produce vertical oscillations (in FIGURE 1) of the roller 16.

The vertical oscillations of the roller 16 cause the arm 24 to pivot about fulcrum 32 so the arm end 34 causes the spool-like construction 36 to oscillate up and down on the drive shaft 38.

The spool 36 engages and vertically oscillates the upwardly biased lever 40 by means of its upper flange 42.

The lever 40 may have one end or part fulcrumed at fulcrum 44 on a drive shaft supporting plate 46. The other end or part 48 of lever 40 may oscillate the over-center snap mechanism 50 which in turn oscillates a link 52 which modifies or oscillates the energy flow controller 20 as by opening and closing the electrical contacts 21A, etc. These contacts may control one or more electrically controlled devices, such as parts of a washing machine, forming press, or any other desired device. The end 48 of lever 40 passes through opening 54 in plate 46.

The spool 36 may be upwardly biased by the spring 56 which is in tension between the flange 58 on the U-shaped lever construction 60 of the snap acting mechanism 50 and the upper end 62 of lever 40. The spring 56 and lever 60 may be constructed always to produce an upward component of pull on lever 40 which acts on flange 42. Abutments 61 stop leftward movement of plate 63, FIGURES 1 and 4, as well as link 52 and downward movement of U lever 60.

However, if desired, the spool 36 may be upwardly biased by any other spring construction. For example, it may be biased by a compression coil spring 57 between a disc construction 102 fixed to shaft 38 and the lower disc of the spool 36. The spring 57 may be used or omitted, depending on the action and construction of spring 56.

The lever 60 is fulcrumed at 64 by wire 66 which passes through upward flanges 68 and the legs of U lever 60. The wire 66 is held by hook 70.

The spring 56 produces snap action in lever 60 and switch 20 by over-centering the fulcrum 64 of lever 60 as the upper end 62 of lever 40 is raised and lowered by the vertical oscillation of roller 16 as it passes over the notches 14 and tongues 18 of card 12.

Figure 4:
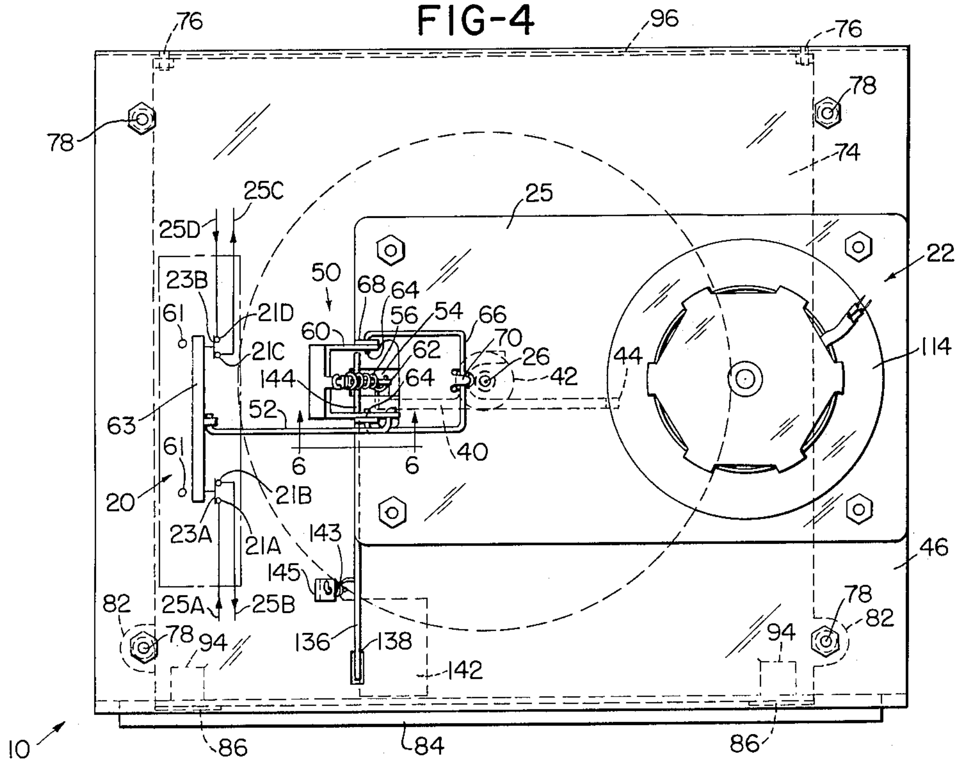
FIGURE 4 is a view along line 4—4 of FIGURE 1.

FIGURE 4 shows switch 20 diagrammatically and FIGURES 1 and 2 shows it more or less structurally. In either case the switch 20 may have any number of pairs of stationary contacts such as 21A, 21B and 21C, 21D which may be bridged by movable bridging contacts 23A and 23B, which are carried by movable plate 63.

The stationary contacts 21A, 21B, 21C and 21D may be connected to lead connectors 25A, 25B, 25C, and 25D respectively.

A card supporting plate 72 may be provided over which a card retaining plate 74 is hinged by hinges at 76. The plates 72 and 46 are held together by bolts 78 and spacing sleeves 80.

The card retaining plate 74 has ears 82 which surround the sleeves 80 and hold the plate 74 in aligned condition.

The card supporting plate 72 has a downwardly slanting flange 84 to guide the card 12 as it is inserted between the plates 72 and 74. The plate 74 has upward flanges 86 to prevent inserting the card 12 above the plate 74. The plate 72 also has upwardly struck card retaining ears 88 which guide the leading edges 90 of the card 12 upward to lift plate 74 while the card is being inserted. When the card 12 has been completely inserted, the offset portions 92 snap down over the inside edges 94 of the ears 88 and secure the card 12 against inward and outward movement, as the upward flange 96 of plate 72 holds the ends 90 of the card 12 and the ears 88 hold the offsets 92 of card 12. The card 12 is held from sidewise movement by the spacing sleeves 80, which hold and guide the sides 98 of the card 12.

The pivoted arm 24 is rotated and supported by a radial arm 100 which is supported by a central disc construction 102, which is secured to and is rotated by drive shaft 38. The arm 100 has upward ears 104 which carry the fulcrum pins 32 for arm 24. The arm 100 also has an upward end flange 106 which carries a roller 108. The roller 108 rides against the bottom of plate 46 and holds arm 100 and fulcrum 32 down so the fulcrum 32 is held firm and causes roller 16 to oscillate arm 24 as the roller 16 rides over the tongues 18 of the card 12.

In FIGURE 1, the left lever length of arm 24 from fulcrum 32 to the spool 36 is approximately 2½ times the lever length from fulcrum 32 to roller 16. Therefore, any vertical oscillation of roller 16 is multiplied 2½ times at the spool 36. The vertical oscillation of spool 36 is, in turn, multiplied approximately 2 times at the left upper end 62 of lever 40. Therefore, the original vertical oscillation of roller 16 is multiplied 5 times at lever end 62 and lower end of spring 56. So ample travel is provided for the lower end of spring 56 to produce an over-center action at fulcrum 64, to produce the snap action of lever 60 and switch contacts 21.

The plate 72 cooperates with the tongues 18 and notches 14 to produce proper oscillation of the roller 16. The plate 72 supports the tongues 18 while the roller 16 is riding over them. The plate 72 supports the roller 16 while the roller is moving over the notches 14. Therefore, the plate 72 cooperates to insure that roller 16 correctly oscillates vertically a distance substantially equal to the thickness of the card 12. The plate 72 also prevents almost certain destruction or undue binding of tongue 18. Because of plate 72, the card 12 may be made of cardboard, if desired. However, it may also be made of metal or plastic or other material, if desired.

An advantage of the card construction is that the notches 14 and tongues 18 may be made of variable width by producing radial slits 110 at regular intervals equivalent, for example, to approximately 1 minute of hour hand travel speed. Suitable scoring 112 may be provided at the outer ends of the tongues 18. The user may produce notches 14 of any desired width and position merely by tearing off corresponding tongues 18 at such desired notch space and a notch is then produced. By tearing off adjacent tongues 18 notches of wider extents are produced, such as at 14A.

The drive shaft 38 may be rotated by timer motor 22 at any desired speed and, for example, may be driven at hour hand speed of one revolution every 12 hours. This may be accomplished by any desired gear train to produce the desired rotation speed of shaft 38.

The motor 22 may be any suitable A.C. motor which rotates at substantially constant or synchronous speed. A suitable gear reduction 114 may be included, which may rotate the shaft 116 at minute hand speed. The shaft 116 may have a slip clutch 118 which drives the composite gears 120 and 122 and shaft 124 and minute hand 126 at minute hand speed. The gear may be connected to a suitable minute to hour intermediate gear 127 and hour hand gear 128 and to the hour shaft 129 and hour hand 130 at hour hand speed.

The hands 126 and 130 may be placed over a suitable clock face on plate 72, and plate 72 may be made the front face of the control device. A suitable setting minute knob 132 may be provided for shaft 124 and minute hand 126.

A suitable gear train 134 may be interposed between the intermediate minute to hour gear 127 and the hour gear 135 and the drive shaft 38. Preferably, it is of the character that imparts hour hand speed to the shaft 38, for one revolution every 12 hours.

The lever 100 may be secured to shaft 38 by a fixed clutch or by a slip clutch, as desired. The gear trains may be fixed so the roller 16 corresponds in position on the card 12 to the position of hour hand 130 on a clock face, not shown on the bottom of plate 72. For example, if the hour hand 130 is at a position such as 1 minute after 12, not shown, then the roller 16 will be placed over the card 12 at a position corresponding to one minute after twelve on the card. Adjustment of the hour hand 130 by knob 132 likewise adjusts roller 16.

The card 12 may be marked by suitable hour and minute markings corresponding to the standard hour and minute markings on the face of a clock. The roller 16 then will always be over the card at the same hour hand position as hour hand 130 is over its clock face on plate 72.

The user may tear out tongues 18 from a card to be used, to produce notches corresponding to desired intervals. He may then insert the card in the holder 10 and the proper switch actuations will be produced at the selected intervals of time.

The construction may be made so the switch or controller 20 is in any desired condition when the roller is riding in a notch 14 and on the supporting plate 72. For example, the switch 20 may be closed when the roller is in a notch 14.

When the control is applied to an oven with this relationship, the removal of the card 12 from the holder permits the circuit through the holder 10 to be closed, so the oven may be manually controlled, as desired. When the card is inserted, the regular manual control of the oven may be closed, and then the card will control the oven.

The card holding plate 74 may be downwardly biased by a biasing lever 136 which has a fulcrum 138 in the form of a notch which engages plate 46. The lower end 140 of lever 136 has a plate 142 which presses down on plate 74.

The lever 136 is upwardly biased by a tension spring 143 which is supported on plate 46 by an upward flange 145.

When a card 12 is being inserted between upward ears 88 and plate 74, the plates 74 and 142 are forced upwardly by the card 12 to rock the lever 136 about fulcrum 138. This causes upper end 144 of lever 136 to push down the ear 146 of lever 40, 48. This snaps down and holds down the lever 60 and opens the switch contacts 21A, etc., while the card 12 is being inserted in card inserting slot 146.

However, when the card 12 is completely inserted in the holder 10 with the card shoulders or offsets 92 past the inside edges 94 of ears 88, then the plate 142 and end 140 of lever 136 move down and rock the upper lever end 144 upward. This permits the spring 56 and lever 60 to snap up and down freely under the control of roller 16 as the roller moves over notches 14 and tongues 18.

Figure 9:
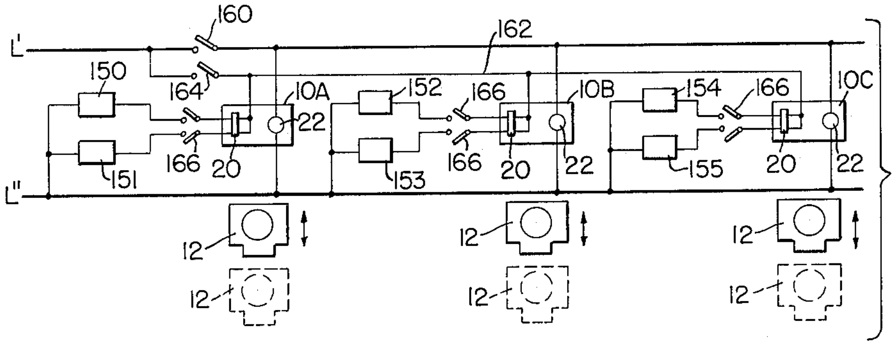
FIGURE 9 is a diagrammatic view showing a typical use of a plurality of controllers with a plurality of devices controlled thereby.

A plurality of controllers or card holders 10A, 10B, 10C, FIGURE 9, may be placed in a factory and the like, adjacent a plurality of machines, ovens, quenchers, etc., 150–155, which may serially act on a product, or a plurality of parts for a product, and the like. The action may be partly or wholly in tandem, etc. The machines, etc., 150–155, may be controlled by the controllers 10A–10C in any desired manner to cause the machines, etc., to perform any desired program on the products being made.

If desired, the timer motors 22 may be placed across power lines L′–L″ under the control of a master switch 160. The controller switches 20 may be placed across from the branch line 162 to the line L″ under the control of a branch switch 164. Each machine 150–155 may have an individual manual switch 166, etc.

A plurality of cards or plates 12 may be selectively insertable into the holders 10A–10C, and the various cards or plates 12 may have individual or identical programs as desired.

In this manner, one or more controllers or holders 10 may be used to control one or more machines, ovens, quenchers, etc., in a factory. The controllers 10 may be used as timers for activating signals, such as whistles. Their use is varied, and the desired program or programs may be individually produced and selected simply by tearing out the desired tongues 18 from the various cards or plates 12, which are to be used. A change in program may be accomplished by the use of an inexpensive card with a newly produced program on said card.

Figure 10:
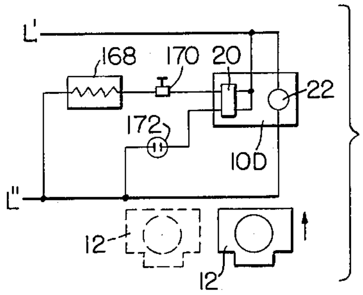

FIGURE 10 shows a holder 10D being used to control the operation of an oven 168 of a domestic range, for example. The housewife may prepare an oven meal and may prepare a card 12 to turn on and off the oven heater at the desired time of day merely by tearing out the desired tongues 18 on the easily understood card. For example, she can tear out all the tongues corresponding from hour 3 to hour 6, and the oven will be heated during that time. If desired, the controller switch 20 may be placed in series with the oven thermostat switch 170. The controller 10D may be so constructed that the switch 20 is closed when there is no card 12 in the controller 10D, so the thermostat switch 170 may be used for manual control. When time control of the oven is desired, the thermostat 170 is set for the desired temperature, the card 12 is prepared for the desired cooking interval, such as from 3 p.m.–6 p.m. by removing the tongues 18 corresponding to the interval, and then the card is inserted in the holder 10D. This is an easily understood procedure.

Also, if desired, an appliance, such as a coffee pot or the like, may be plugged into the appliance plug 172 and a suitably prepared card may be inserted into the holder 10D, so the appliance is activated at the desired time and for the desired interval of time merely by removing the correct tongues in the easily understood manner.

Energy flow controllers of all types may be modified by this invention. For example, switches, valves, power transmissions, clutches, brakes, and the like may be actuated, started and stopped, opened and closed, increased and decreased and the like.

Figures 5, 6, 7, 8:
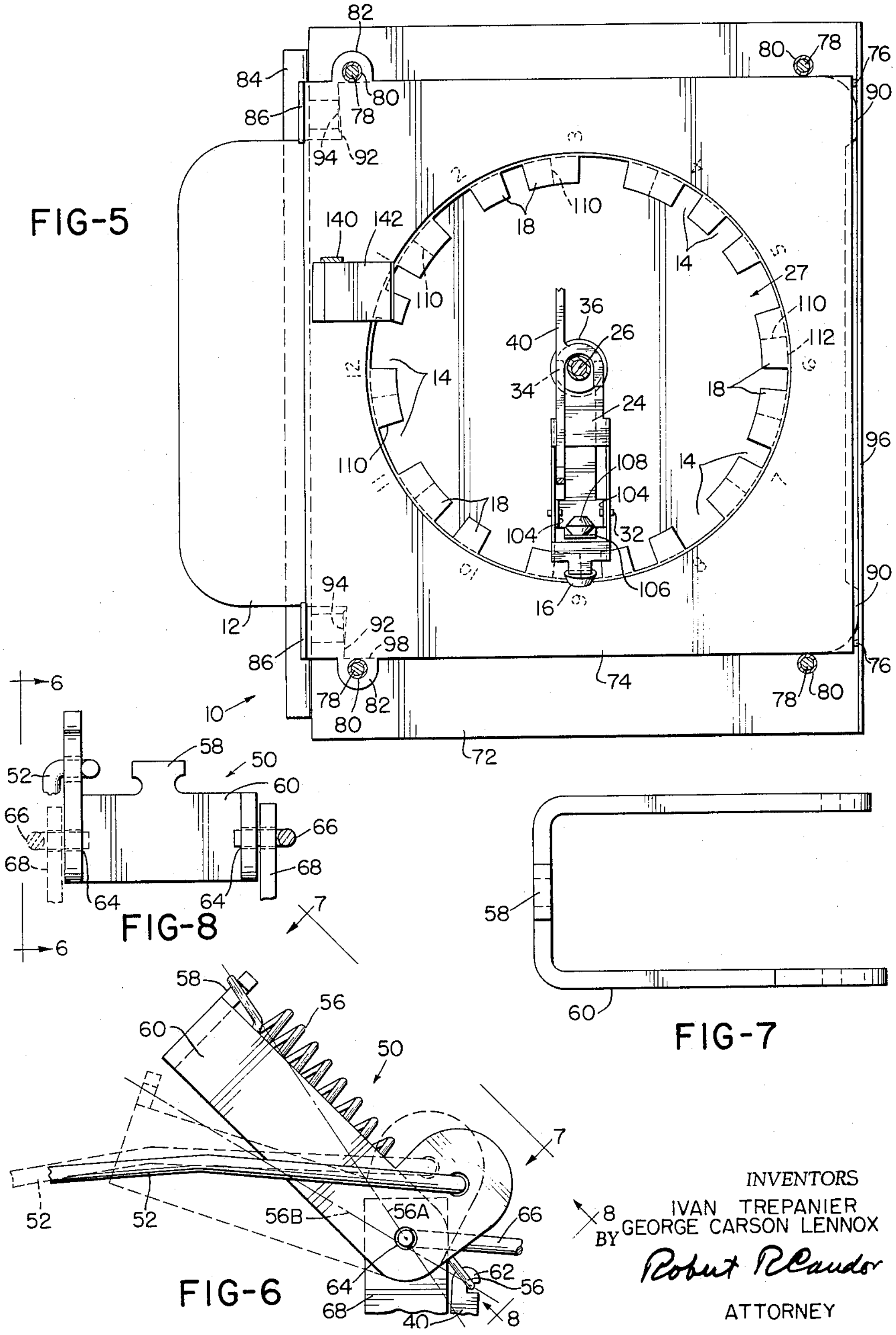
FIGURE 5 is a view along line 5—5 of FIGURE 1.
FIGURE 6 is an enlarged view along line 6—6 of FIGURES 4 and 8.
FIGURE 7 is a view of the snap arm along line 7—7 of FIGURE 6.
FIGURE 8 is a view of the snap arm along the line 8—8 of FIGURE 6.

Referring again to the snap action produced by spring 56, as illustrated in FIGURE 6, a dotted line 56A indicates the position of the center line of spring 56 as it is downwardly crossing the central axis of the fulcrum point 64. This occurs as the end 62 of lever 40 has moved to a sufficiently low position to cause the center line 56A to cross the central axis of the fulcrum point 64. A further downward movement of the lever 40 then causes a downward snap of the lever 60 to the dotted line position.

The full line position of the end 62 of lever 40 indicates the position just as the lever 40 has moved downwardly a slight distance, but not enough to cause any movement in the lever 60.

The dotted line 56B shows the central line of spring 56 as it is moving upwardly, and just before it reaches the upward snapping position, which occurs after the center line 56B crosses the center of the fulcrum 64.

This provides an effective snapping action in either direction.

It is thus to be seen that new and useful time and program controllers and methods of time and program control have been provided.

While the form of the invention now preferred has been disclosed as required by the statutes, other forms may be used, all coming within the scope of the claims which follow.

What is claimed is:

1. In combination: a card holder having a notch reader circularly movable about an axis and insertable into notches; an energy controller; controller modifying means actuated by said reader when reading notches; a card having a circular opening with a center and a notch forming circular edge with notches formable along said circular edge, said card being insertable in said holder;

and card locating means on said holder stationarily to locate said card with said center substantially coinciding with said axis.

2. In combination: a card holder having a pivoted arm circularly movable about an axis; a notch sensing roller on said arm and movable about said axis and causing said arm to pivot as said roller passes into notches; a switch construction; switch construction modifying means actuated in response to the pivoting of said arm; a card having a circular notch construction having radial notches located about a center, said card being removably inserted in said holder; and card locating means on said holder locating said card stationarily with said center substantially coinciding with said axis.

3. In combination: a plate holder having a notch reader circularly movable about an axis and insertable into notches; a switch; switch modifying means actuated by said reader when reading notches; a plate having a circular opening with an opening center and a notch forming circular edge with radial notches along said edge, said plate being insertable in said holder; and plate locating means on said holder to locate said plate stationarily with said center substantially coinciding with said axis.

4. A combination according to claim 3 in which said circular edge has notch forming scorings for forming said notches.

5. In combination: a plate having a circular opening with a center and with a notch forming circular edge having radial notches extending along said edge; a plate holder receiving said plate and having a notch reader circularly movable about an axis and insertable into said notches; a switch; switch modifying means actuated by said reader when reading notches, and plate locating means on said holder to locate said plate stationarily with said center substantially coinciding with said axis.

6. In combination: a plate holder having holding means to hold a plate stationarily with actuating indentations arranged about an axial point inside said holding means; an indentation reader movable about an axis past and into said indentations; an energy controller; controller modifying means actuated by said reader; plate having indentations about said axial point and timer means moving said reader about said axis.

7. In combination: a card holder plate to hold a card stationarily with actuating openings extending through said card and arranged about an axial point; an actuating opening reader movable about an axis past and through said openings and against said holder plate; an energy controller; controller modifying means actuated by said reader; timer means moving said reader about said axis; and a card with actuating openings extending through said card and arranged about an axial point removably inserted adjacent said holder plate with said axial point located substantially coinciding with said axis.

8. In combination: a plate holder; a pivoted arm rotatable about a rotation axis and pivoted toward and away from said plate holder; a plate with a circular opening and with a circular edge with notches along said edge, said plate being removably insertable in said holder stationarily adjacent said arm with the center of said circular opening substantially coinciding with said axis; notch reading means on said arm insertable in said notches and causing said arm to pivot; an energy controller; and means modifying said controller in response to the pivoting of said arm.

9. In combination: a card holder; a card stationarily and removably held in said holder and having an opening with notches along an edge orbitally arranged about a central axis, said notches extending in said card away from said axis; a notch reading construction rotatable about said axis and having a notch reading means to be moved by said construction in and out of said notches; an energy flow controller; and modifying means actuated by said notch reading construction to modify the energy flow through said controller.

10. In combination: a card supporting plate; a card retaining plate adjacent said supporting plate; a drive shaft supporting plate adjacent said retaining plate and having a pivoted roller construction receiving opening; a drive shaft carried by said drive shaft supporting plate; a vertically movable spool on said drive shaft; a pivoted roller construction having a rotatable drive lever rotated by said drive shaft and a reading lever with a fulcrum pivoted on said drive lever and with a reading roller on one side of said fulcrum and with a spool moving engagement on the other side of said fulcrum; a controller actuating lever rocked by said spool; an energy controller carried by said drive shaft supporting plate; and controller modifying means actuated by said actuating lever.

11. A combination according to claim 10 in which a card is insertable between said card supporting plate and said card retaining plate with a circular notch construction over which said reading roller travels.

12. A combination according to claim 11 in which said card has tongues forming said notch construction and in which said reading roller travels over said tongues and on said card supporting plate in notches formed between said tongues.

13. In combination: a card supporting plate; a card supported on said plate having a circular opening with a center with a circular notch construction along the edge of said circular opening; a pivoted roller construction with a reading roller rotatable about said center over said notch construction to produce oscillations in said pivoted roller construction; an energy controller; and controller actuated means actuated by said oscillations.

14. In combination: a first plate; a second plate; a program card between said plates backed up by one of said plates, said card having program irregularities; a program reader movable between said plates and having an engaging member urged against one of said plates and another engaging member urged against said irregularities to produce relative movement between said engaging members; an energy controller; and controller modifying means actuated by said relative movement.

15. A combination according to claim 14 in which said engaging members are roller constructions.

16. A combination according to claim 15 in which said reader is an arm circularly movable between said plates.

17. A combination according to claim 16 in which said program card has a plurality of alternating tongues and notches circularly arranged to cooperate with said arm.

18. A combination according to claim 17 in which one of said roller constructions alternately engages said tongues and notches and said one of said plates which backs up said card.

19. In combination: a first member having a first flat surface; a second member having a second flat surface parallel to said first flat surface; a program plate mountable between said flat surfaces and against said second flat surface, said plate having program irregularities; a program reader movable between said surfaces and having a first engaging member urged against said first flat surface and a second engaging member urged against said irregularities to produce relative movement between said engaging members; an energy controller; and controller modifying means actuated by said relative movement.

20. A combination according to claim 19 in which said irregularities are notches and tongues forming alternately covered and uncovered portions of said second flat surface, and said second engaging member alternately engaging said covered and uncovered portions of said second flat surface.

21. In combination: a first member having a first smooth surface; a second member having a second smooth surface equally distant from said first smooth surface;

a program member mountable between said surfaces and on said second smooth surface, said program member having program irregularities with equally distant smooth sides between said program irregularities; a program reader relatively movable between said first and second smooth surfaces and having a first engaging member urged against said first smooth surface and a second engaging member urged against said irregularities to produce relative movement between said engaging members; an energy controller; and controller modifying means actuated by said relative movement.

22. In combination: a first member having a first flat surface; a second member having a second flat surface parallel to said first flat surface; a program plate between said flat surfaces and held against said second flat surface, said plate having program openings to produce covered and uncovered portions of said second surface circularly arranged about a transverse axis; a program reader movable between said surfaces and having an arm rotatable substantially about said transverse axis and having a first engaging member urged against said first flat surface, and having a pivoted lever pivoted on said arm and having a second engaging member urged against said covered and uncovered portions to produce relative movement between said engaging members and rocking movement of said pivoted lever; an energy controller; and controller modifying means actuated by said relative movement.

23. A combination according to claim 22 in which said program plate is insertable parallel to and between said flat surfaces and has a circular tongue and notch construction coaxial with said transverse axis with said notches forming said openings, and in which said first and second engaging members are first and second roller constructions with said first roller construction rolling against said first flat surface and with said second roller rolling over said tongues and over said uncovered portions of said second flat surface.

24. A combination according to claim 23 in which a drive shaft extends between said first and second flat surfaces coaxial with said transverse axis and is drivingly connected to said arm and has an axially movable spool which is axially movable by said pivoted lever and actuates said energy controller.

25. A combination according to claim 24 in which said program plate is a card with a main circular opening having a center coaxial with said transverse axis and having radial slits extending outward from said main circular opening and forming severable tongues to be severed to form said notches.

References Cited by the Examiner

UNITED STATES PATENTS

| | | | |
|---|---|---|---|
| 2,524,338 | 10/1950 | Ylinen | 200—46 |
| 2,671,148 | 3/1954 | Schulenburg | 200—153 |
| 2,905,777 | 9/1959 | Gayring | 200—153 |
| 3,070,673 | 12/1962 | Beguin | 200—46 |

ROBERT S. MACON, *Acting Primary Examiner.*

ROBERT K. SCHAEFER, *Examiner.*